United States Patent
Jang et al.

(10) Patent No.: US 9,953,600 B2
(45) Date of Patent: Apr. 24, 2018

(54) DISPLAY APPARATUS AND METHOD OF MANUFACTURING THE SAME

(71) Applicant: SAMSUNG DISPLAY CO., LTD., Yongin-si, Gyeonggi-Do (KR)

(72) Inventors: Se-Hui Jang, Yongin-si (KR); Chong-Guk Lee, Yongin-si (KR); Sang-Moon Moh, Hwaseong-si (KR); Su-Mi Moon, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 175 days.

(21) Appl. No.: 15/141,912

(22) Filed: Apr. 29, 2016

(65) Prior Publication Data
US 2017/0069253 A1 Mar. 9, 2017

(30) Foreign Application Priority Data
Sep. 7, 2015 (KR) .................... 10-2015-0126291

(51) Int. Cl.
*G06F 3/038* (2013.01)
*G09G 3/36* (2006.01)
*G02F 1/1333* (2006.01)

(52) U.S. Cl.
CPC ......... *G09G 3/3648* (2013.01); *G02F 1/1333* (2013.01); *G09G 2300/0426* (2013.01); *G09G 2300/08* (2013.01)

(58) Field of Classification Search
USPC ................ 345/204, 205, 206, 1.3, 174, 501; 349/149, 58; 257/99
See application file for complete search history.

(56) References Cited

U.S. PATENT DOCUMENTS

| | | | |
|---|---|---|---|
| 2001/0012087 A1* | 8/2001 | Sasuga | G02F 1/133308 349/149 |
| 2005/0157241 A1* | 7/2005 | Sasuga | G02F 1/133308 349/149 |
| 2008/0062348 A1* | 3/2008 | Sasuga | G02F 1/133308 349/58 |
| 2011/0141042 A1* | 6/2011 | Kim | G02F 1/13338 345/173 |

(Continued)

FOREIGN PATENT DOCUMENTS

KR  10-0618898  8/2006

*Primary Examiner* — Thuy Pardo
(74) *Attorney, Agent, or Firm* — F. Chau & Associates, LLC

(57) ABSTRACT

A display apparatus includes a first substrate and a second substrate. The first substrate includes a switching element and a pixel electrode electrically connected to the switching element. A display panel driver applies a driving signal to the display panel. The display panel driver includes a printed circuit board including a first bonding pad and a flexible substrate electrically connecting the printed circuit board with the display panel. The flexible substrate includes a second bonding pad. The second bonding pad is electrically connected to the first bonding pad of the printed circuit board. The first bonding pad overlaps the second bonding pad. At least a portion of the first bonding pad and at least a portion of the second bonding pad extend in a direction which is at an acute angle with respect to a first direction parallel with a relatively longer side of the display panel.

20 Claims, 15 Drawing Sheets

(56) References Cited

U.S. PATENT DOCUMENTS

| | | | | |
|---|---|---|---|---|
| 2011/0298811 A1* | 12/2011 | Al-Dahle | ............... | H05K 3/361 |
| | | | | 345/501 |
| 2013/0127879 A1* | 5/2013 | Burns | ................... | G01L 9/0051 |
| | | | | 345/501 |
| 2013/0135317 A1* | 5/2013 | Shenoy | ............... | B81C 1/00047 |
| | | | | 345/501 |
| 2014/0049449 A1* | 2/2014 | Park | ........................ | G09G 5/00 |
| | | | | 345/1.3 |
| 2014/0210784 A1* | 7/2014 | Gourevitch | .......... | H03K 17/962 |
| | | | | 345/174 |
| 2015/0325755 A1* | 11/2015 | Speer | ................... | H01L 33/486 |
| | | | | 257/99 |

* cited by examiner

FIG. 4
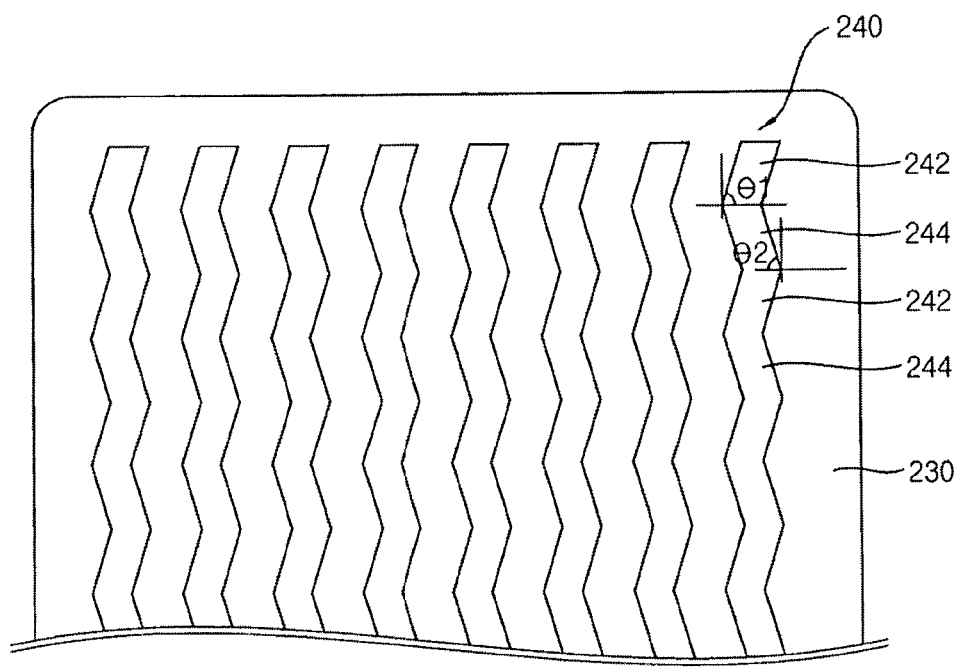
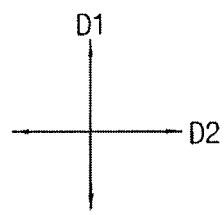

DISPLAY APPARATUS AND METHOD OF MANUFACTURING THE SAME

CROSS-REFERENCE TO RELATED APPLICATION

This application claims priority under 35 USC § 119 to Korean Patent Application No. 10-2015-0126291, filed on Sep. 7, 2015 in the Korean Intellectual Property Office (KIPO), the disclosure of which is incorporated by reference herein in its entirety.

1. TECHNICAL FIELD

Exemplary embodiments of the present invention relate to a display apparatus. More particularly, exemplary embodiments of the present invention relate to a method of manufacturing the display apparatus.

2. DISCUSSION OF RELATED ART

A display apparatus may include a display panel and a display panel driver. The display panel driver may include a printed circuit board and a flexible substrate which may connect the printed circuit board with the display panel electrically.

A driving chip of the display panel driver may be disposed on a peripheral region of the display panel in a COG (chip on glass) configuration. The driving chip of the display panel driver may be disposed on a flexible film connected to the peripheral region of the display panel in a COF (chip on film) configuration.

The flexible substrate may adhere to the printed circuit board. A stress may be applied to the flexible substrate, and an adhesion between the flexible substrate and the printed circuit board may decrease. Electrical connection reliability between the flexible substrate and the printed circuit board may decrease.

SUMMARY

Some exemplary embodiments of the present invention may provide a display apparatus with increased electrical connection reliability between the flexible substrate and the printed circuit board.

Some exemplary embodiments of the present invention may provide a method of manufacturing a display apparatus with increased electrical connection reliability between the flexible substrate and the printed circuit board.

According to an exemplary embodiment of the present invention, a display apparatus includes a first substrate and a second substrate facing the first substrate. The first substrate includes a switching element and a pixel electrode electrically connected to the switching element. A display panel driver applies a driving signal to the display panel. The display panel driver includes a printed circuit board including a first bonding pad and a flexible substrate electrically connecting the printed circuit board with the display panel. The flexible substrate includes a second bonding pad. The second bonding pad is electrically connected to the first bonding pad of the printed circuit board. The first bonding pad overlaps the second bonding pad. At least a portion of the first bonding pad and at least a portion of the second bonding pad extend in a direction which is at an acute angle with respect to a first direction parallel with a relatively longer side of the display panel.

In an exemplary embodiment of the present invention, the first bonding pad may include a first extension portion extending in a second direction which is at a first acute angle with respect to the first direction and a second extension portion extending in a third direction which is at a second acute angle with respect to the first direction. The second bonding pad may include a first extension portion extending in the second direction and a second extension portion extending in the third direction.

In an exemplary embodiment of the present invention, each of the first bonding pad and the second bonding pad may extend with a zigzag shape.

In an exemplary embodiment of the present invention, a width of the first extension portion of the first bonding pad may decrease along a fourth direction parallel with a relatively shorter side of the display panel. A width of the second extension portion of the first bonding pad may increase along the fourth direction.

In an exemplary embodiment of the present invention, the display panel may include a third bonding pad. The third bonding pad may be electrically connected to the switching element. The flexible substrate may include a fourth bonding pad electrically connected to the third bonding pad. The fourth bonding pad overlaps the third bonding pad.

In an exemplary embodiment of the present invention, the third bonding pad may include a first extension portion extending in a second direction which is at a first acute angle with respect to the first direction and a second extension portion extending in a third direction which is at a second acute angle with respect to the first direction. The fourth bonding pad may include a first extension portion extending in the second direction and a second extension portion extending in the third direction.

In an exemplary embodiment of the present invention, each of the third bonding pad and the fourth bonding pad may extend with a zigzag shape.

In an exemplary embodiment of the present invention, a width of the first extension portion of the third bonding pad may decrease along a fourth direction parallel with a relatively shorter side of the display panel. A width of the second extension portion of the third bonding pad may increase along the fourth direction.

In an exemplary embodiment of the present invention to the switching element. The display panel driver may include a driving chip applying the driving signal to the data line or the gate line.

In an exemplary embodiment of the present invention, the driving chip may be disposed on the flexible substrate.

In an exemplary embodiment of the present invention, the driving chip may be disposed on the display panel.

In an exemplary embodiment of the present invention, the driving chip may include a data driving chip applying a data signal to the data line and a gate driving chip applying a gate signal to the gate line.

According to an exemplary embodiment of the present invention, in a method of manufacturing a display apparatus, a display panel including a first substrate and a second substrate facing the first substrate is provided. The first substrate includes a switching element and a pixel electrode electrically connected to the switching element. A first bonding pad is formed on a printed circuit board. The first bonding pad extends in a direction. The direction is at acute angle with respect to a first direction parallel with a relatively longer side of the display panel. An anisotropic conductive film is formed on the first bonding pad. A second bonding pad is formed on a flexible substrate. The second bonding pad extends in the direction at the acute angle with respect to the first direction. The flexible substrate is aligned with the printed circuit board such that at least a portion of the flexible substrate overlaps at least a portion of the printed circuit board. A thermal compression process is performed on at least the portion of the flexible substrate and at least the portion of the printed circuit board to electrically connect the first bonding pad with the second bonding pad. The flexible substrate is connected to the display panel.

In an exemplary embodiment of the present invention, in a formation of the first bonding pad on the printed circuit board, a first extension portion of the first bonding pad extending in a second direction which is at a first acute angle with respect to the first direction may be formed. A second extension portion of the first bonding pad extending in a third direction which is at a second acute angle with respect to the first direction may be formed.

In an exemplary embodiment of the present invention, the first bonding pad may extend with a zigzag shape.

In an exemplary embodiment of the present invention, a width of the first extension portion of the first bonding pad may decrease along a fourth direction parallel with a relatively shorter side of the display panel. A width of the second extension portion of the first bonding pad may increase along the fourth direction.

In an exemplary embodiment of the present invention, in a formation of the second bonding pad on the flexible substrate, a first extension portion of the second bonding pad extending in a second direction which is at a first acute angle with respect to the first direction panel may be formed. A second extension portion of the second bonding pad extending in a third direction which is at a second acute angle with respect to the first direction may be formed.

In an exemplary embodiment of the present invention, the second bonding pad may extend with a zigzag shape.

In an exemplary embodiment of the present invention, a width of the first extension portion of the second bonding pad may decrease along a fourth direction parallel with a relatively shorter side of the display panel. A width of the second extension portion of the second bonding pad may increase along the fourth direction.

In an exemplary embodiment of the present invention, the display panel may include a data line and a gate line electrically connected to the switching element. The first bonding pad may be electrically connected to the data line or the gate line.

In a display apparatus according to an exemplary embodiment of the present invention, a first bonding pad of the printed circuit board and a second bonding pad of the flexible substrate may extend in a direction which is at an acute angle with respect to a first direction parallel with a relatively longer side of the display panel, and the first and second bonding pads may be bonded.

Accordingly to an exemplary embodiment of the present invention, a stress applied to the flexible substrate may be distributed, and an adhesion between the flexible substrate and the printed circuit board may increase. Electrical connection reliability between the flexible substrate and the printed circuit board may be increased.

BRIEF DESCRIPTION OF THE DRAWINGS

A more complete appreciation of the present inventive concept will become more apparent by describing in detail exemplary embodiments thereof with reference to the accompanying drawings, in which:

FIG. 4 is an enlarged view of region A of FIG. 1 illustrating a portion of the flexible substrate.

DETAILED DESCRIPTION

Figure 1:
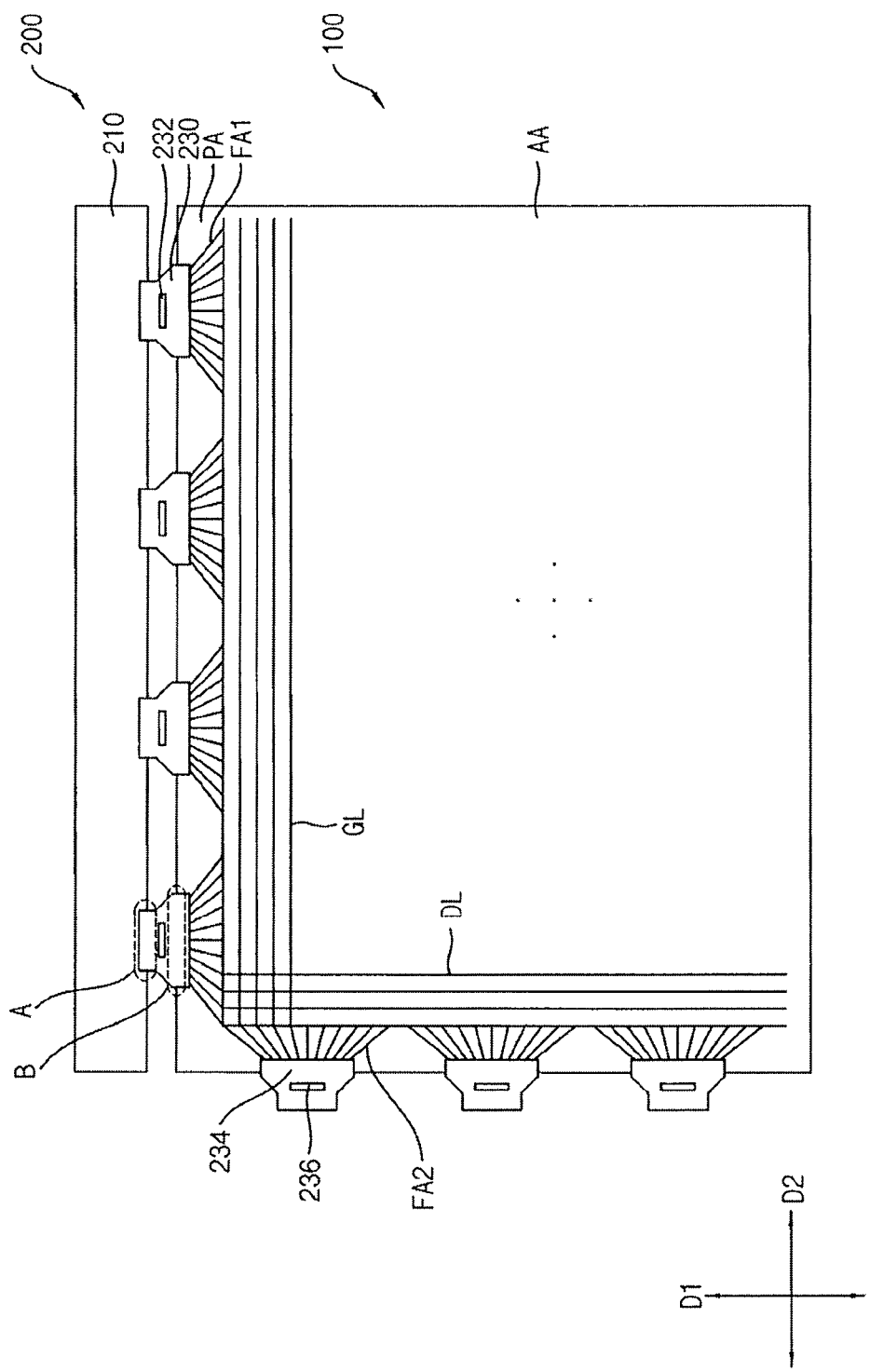
FIG. 1 is a plan view illustrating a display apparatus according to an exemplary embodiment of the present invention.

Exemplary embodiments of the present invention will be described in more detail below with reference to the accompanying drawings, in which exemplary embodiments are illustrated. Exemplary embodiments of the present invention may, however, be embodied in many different forms and should not be construed as limited to the embodiments set forth herein. Like reference numerals refer to like elements throughout the specification and drawings.

Figure 2:
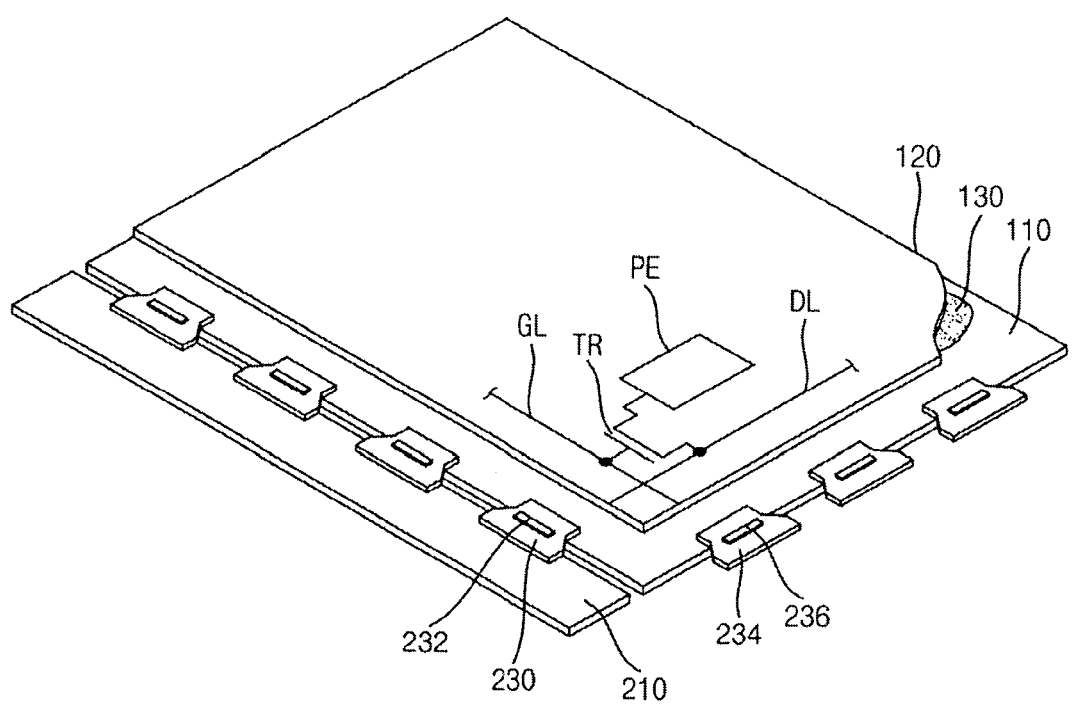
FIG. 2 is a perspective view illustrating the display apparatus of FIG. 1.
Figure 3:
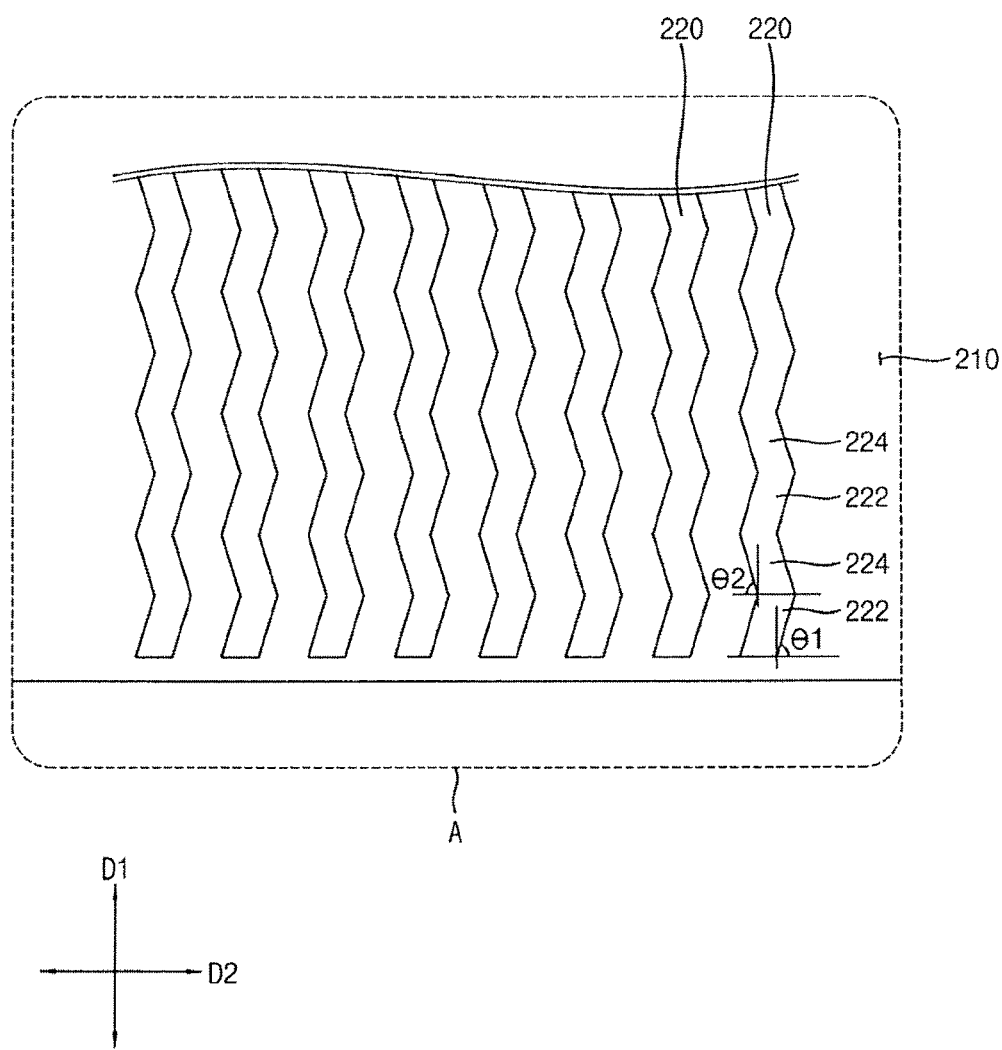
FIG. 3 is an enlarged view of region A of FIG. 1 illustrating a portion of the printed circuit board of FIG. 1.
Figure 5:
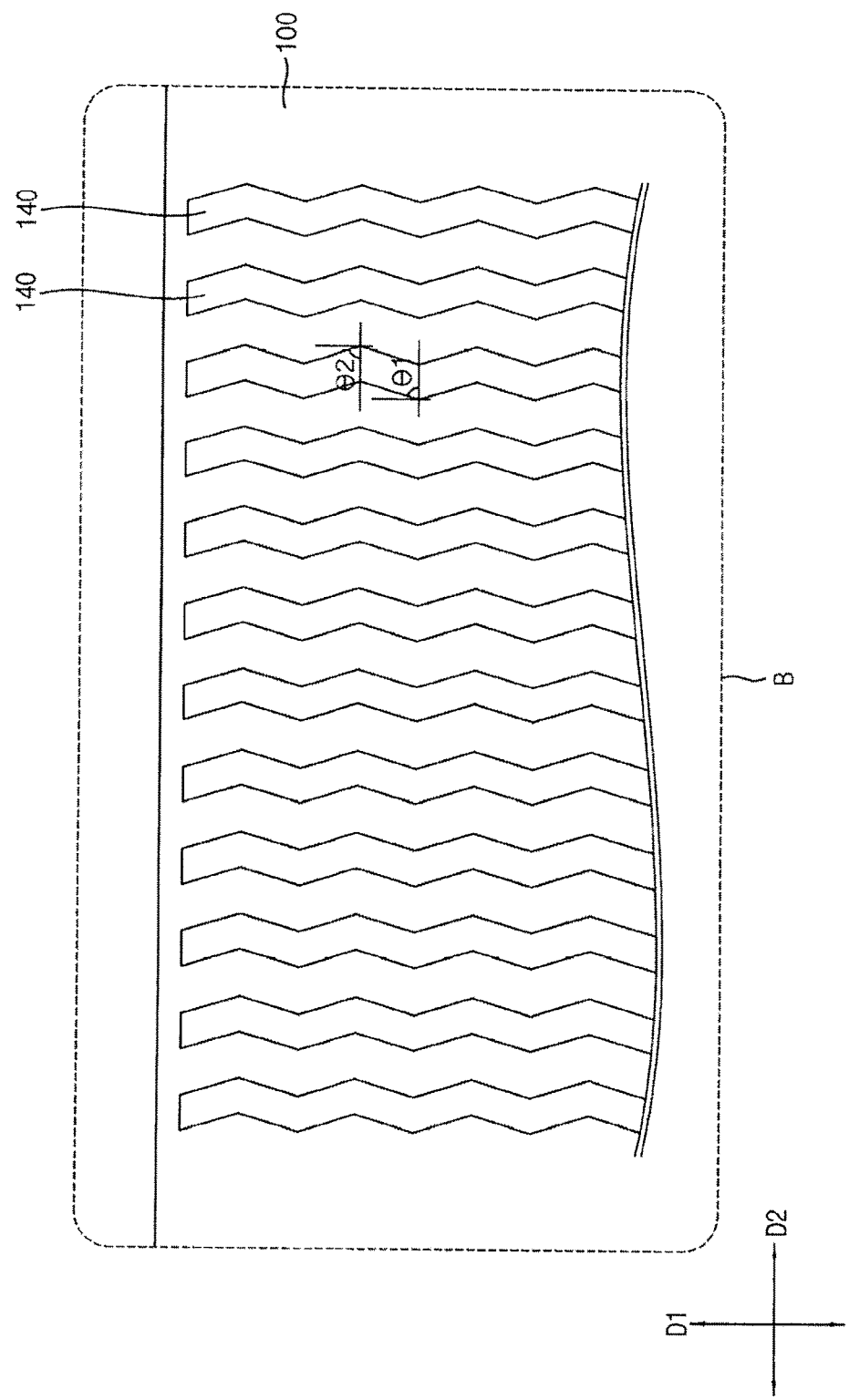
FIG. 5 is an enlarged view of region B of FIG. 1 illustrating a portion of the display panel.
Figure 6:
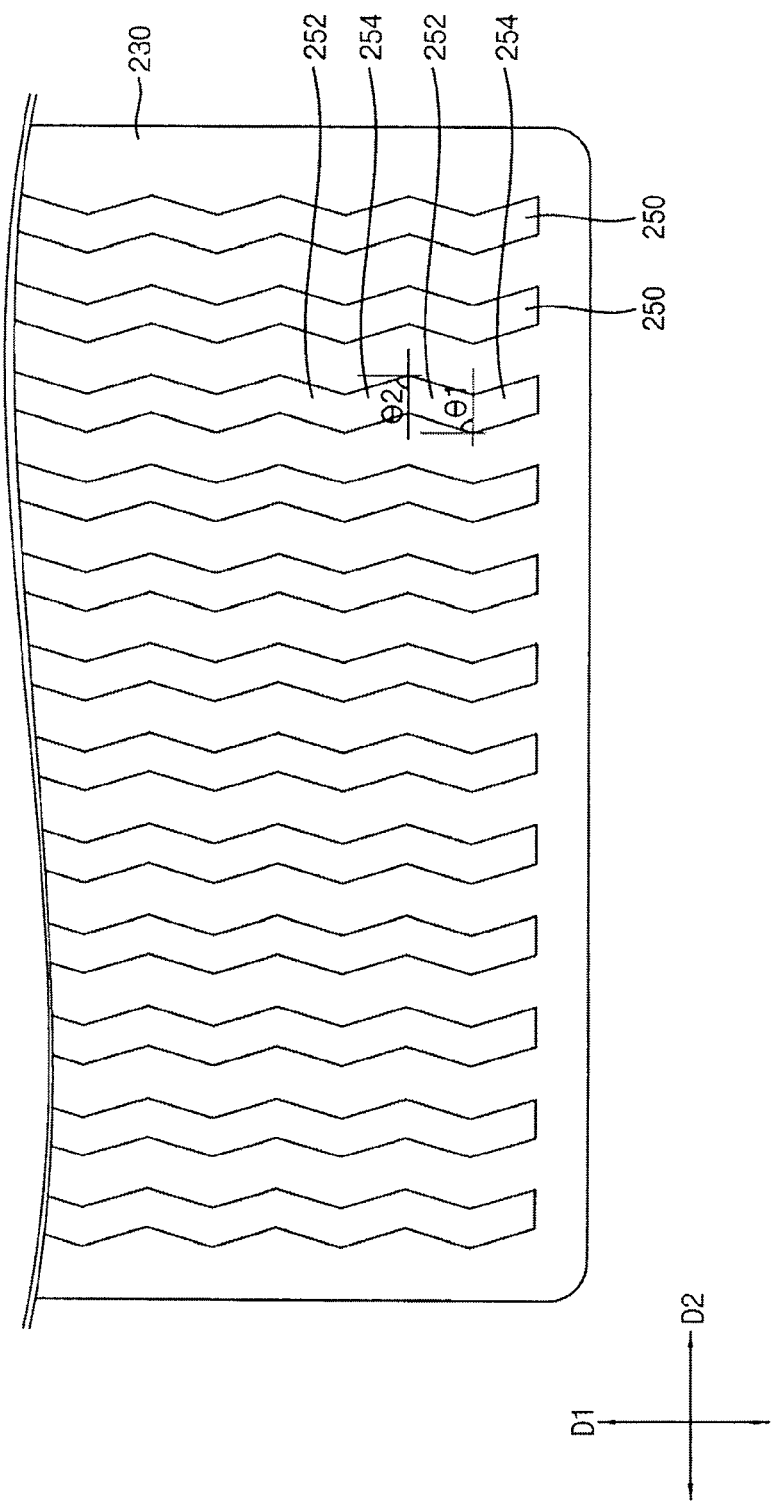
FIG. 6 is an enlarged view of region B of FIG. 1 illustrating another portion of the flexible substrate.

FIG. 1 is a plan view illustrating a display apparatus according to an exemplary embodiment of the present invention. FIG. 2 is a perspective view illustrating the display apparatus of FIG. 1. FIG. 3 is an enlarged view of region A of FIG. 1 illustrating a portion of the printed circuit board of FIG. 1. FIG. 4 is an enlarged view of region A of FIG. 1 illustrating a portion of the flexible substrate. FIG. 5 is an enlarged view of region B of FIG. 1 illustrating a portion of the display panel. FIG. 6 is an enlarged view of region B of FIG. 1 illustrating another portion of the flexible substrate.

Referring to FIGS. 1 to 6, a display apparatus may include a display panel 100 and display panel driver 200.

The display panel 100 may include an active region AA on which an image may be displayed and a peripheral region PA adjacent to the active region AA. The peripheral region might not display the image. The active region AA may be referred to as a display region.

The display panel 100 may include a plurality of gate lines GL, each of which may extend along a first direction D1, and a plurality of data lines DL, each of which may extend along a second direction D2 crossing the first direction D1. The display panel 100 may include a plurality of pixels. The pixels may be electrically connected to the gate lines GL and the data lines DL. The gate lines GL, the data lines DL and the pixels may be disposed in the active region AA of the display panel 100.

Each pixel may include a switching element TR, a liquid crystal capacitor and a storage capacitor. The liquid crystal capacitor and the storage capacitor may be electrically connected to the switching element TR. The pixels may be disposed in a matrix.

The display panel 100 may include a first substrate 110 and a second substrate 120 opposite to the first substrate 110.

The first substrate 110 may be an array substrate. The gate lines GL and the data lines DL may be disposed on the first substrate 110. A plurality of switching elements TR connected to the gate lines GL and the data lines DL may be disposed on the first substrate 110. A pixel electrode PE may be disposed on the first substrate 110.

The second substrate 120 may be disposed opposite to the first substrate 110. A common electrode facing the pixel electrode PE may be disposed under the second substrate 120. A color filter defining a color of the pixel may be disposed under the second substrate 120. The common electrode may be disposed on the first substrate 110. The color filter may be disposed on the first substrate 110.

An overlap area between the first substrate 110 and the second substrate 120 may be an area that is substantially the same as the area of the active region AA of the display panel 100. The overlap area between the first substrate 110 and the second substrate 120 except for the area where the sealing member is disposed may be defined as the active region AA of the display panel 100.

The display apparatus may include a display unit 130 disposed between the first and second substrates 110 and 120. The display unit 130 may include an organic light emitting layer. The display unit 130 may include a liquid crystal layer.

The display panel driver 200 may apply a driving signal to the display panel 100. The display panel driver 200 may include a printed circuit board 210 including a first bonding pad 220, a flexible substrate 230 including a second bonding pad 240 and electrically connecting the printed circuit board 210 with the display panel 100. The first bonding pad 220 may overlap the second bonding pad 240.

The display panel driver 200 may include a data driving chip 232 disposed on the flexible substrate 230. The data driving chip 232 may be electrically connected to one of the data lines DL of the display panel 100 and may apply the driving signal to the one of the data lines DL.

The display panel driver 200 may include a gate flexible substrate 234 which may be electrically connected to the display panel 100 and a gate driving chip 236 which may be disposed on the gate flexible substrate 234.

The printed circuit board 210 may include a driving circuit such as a timing controller, or a power voltage generator. The flexible substrate 230 may include polyimide.

The timing controller may receive input image data and an input control signal from an external apparatus. The input image data may include red image data, green image data and blue image data. The input control signal may include a master clock signal and a data enable signal. The input control signal may include a vertical synchronizing signal and a horizontal synchronizing signal.

The timing controller may generate a first control signal, a second control signal and a data signal based on the input image data and the input control signal.

The timing controller may generate the first control signal for controlling an operation of the gate driving chip 226 based on the input control signal, and may output the first control signal to the gate driving chip 226.

The timing controller may generate the second control signal for controlling an operation of the data driving chip 232 based on the input control signal, and may output the second control signal to the data driving chip 232.

The timing controller may generate a data signal based on the input image data. The timing controller may output the data signal to the data driving chip 232.

The gate driving chip 236 may generate gate signals driving the gate lines GL in response to the first control signal received from the timing controller. The gate driving chip 236 may sequentially output the gate signals to the gate lines GL.

The data driving chip 232 may receive the second control signal and the data signal from the timing controller. The data driving chip 232 may convert the data signal into analog data voltages. The data driving chip 232 may output the data voltages to the data lines DL.

The data driving chip 232 may be disposed on the flexible substrate 230 in a COF (chip on film) configuration. For example, the data driving chip 232 may be adhered to the flexible substrate 230 by an adhesive layer disposed between the data driving chip 232 and the flexible substrate 230.

The gate driving chip 236 may be disposed on the gate flexible substrate 234. For example, the gate driving chip 236 may be adhered to the gate flexible substrate 234 by an adhesive layer disposed between the gate driving chip 236 and the gate flexible substrate 234.

Each of the first bonding pad 220 of the printed circuit board 210 and the second bonding pad 240 may extend in a direction. The direction in which the first bonding pad 220 of the printed circuit board 210 and the second bonding pad 240 extend may be at an acute angle with respect to the first direction D1 parallel with a relatively shorter side of the display panel 100 and the second direction D2 parallel with a relatively longer side of the display panel 100.

Referring to FIG. 3, the first bonding pad 220 may include a first extension portion 222 extending in a third direction which is at a first acute angle θ1 with respect to the relatively longer side of the display panel 100 and a second extension portion 224 extending in a fourth direction which is at a second acute angle θ2 with respect to the relatively longer side of the display panel 100.

The first bonding pad 220 may include a plurality of first extension portions 222 and a plurality of second extension portions 224. The plurality of first extension portions 222 and the plurality of second extension portions 224 may be connected to each other repeatedly to form a continuous extension portion having a zigzag shape.

Referring to FIG. 4, the second bonding pad 240 may include a first extension portion 242 extending in the third direction and a second extension portion 244 extending in the fourth direction.

The second bonding pad 240 may include a plurality of first extension portions 242 and a plurality of second extension portions 244. The plurality of first extension portions 242 and a plurality of second extension portions 244 may be connected to each other repeatedly to form a continuous extension portion having a zigzag shape.

In an exemplary embodiment of the present invention, the display apparatus may include a plurality of first bonding pads 220 of the printed circuit board 210 and a plurality of second bonding pads 240 of the flexible substrate 230.

Thus, the number of first bonding pads 220 may correspond to the number of second bonding pads 240 and the first bonding pads 220 and the second bonding pads 240 may be electrically connected to each other.

Each of the first bonding pads 220 and each of the second bonding pads 240 may extend with a zigzag shape.

Referring to FIGS. 5 and 6, the display panel 100 may include a third bonding pad 140 electrically connected to the switching element TR, and the flexible substrate 230 may include a fourth bonding pad 250 electrically connected to the third bonding pad 140 and overlapping the third bonding pad 140.

Each of the third bonding pad 140 on the display panel 100 and the fourth bonding pad 250 of the flexible substrate 230 may extend in a direction. The direction in which the third bonding pad 140 on the display panel 100 and the fourth bonding pad 250 of the flexible substrate 230 extend may be at an acute angle with respect to the relatively longer side and the relatively shorter side of the display panel 100.

The third bonding pad 140 may include a first extension portion 142 extending in the third direction and a second extension portion 144 extending in the fourth direction.

The third bonding pad 140 may include a plurality of first extension portions 142 and a plurality of second extension portions 144 connected to each other repeatedly to form a continuous extension portion having a zigzag shape.

The fourth bonding pad 250 may include a first extension portion 252 extending in the third direction and a second extension portion 254 extending in the fourth direction.

The fourth bonding pad 250 may include a plurality of first extension portions 252 and a plurality of second extension portions 254 connected to each other repeatedly to form a continuous extension portion having a zigzag shape.

In an exemplary embodiment of the present invention, the display apparatus may include a plurality of third bonding pads 140 and a plurality of fourth bonding pads 250.

Thus, the number of third bonding pads 140 may correspond to the number of fourth bonding pads 250. The third bonding pads 140 and the fourth bonding pads 250 may be electrically connected to each other.

Each of the third bonding pads 140 and each of the fourth bonding pads 250 may extend with a zigzag shape.

The printed circuit board 210 may be electrically connected to the flexible substrate 230 through the first and second bonding pads 220 and 240. For example, the printed circuit board 210 may be electrically connected to the data driving chip 232 on the flexible substrate 230 through the first and second bonding pads 220 and 240.

The flexible substrate 230 may be electrically connected to the display panel 100 through the third and fourth bonding pads 140 and 250. For example, the flexible substrate 230 may be electrically connected to one of the data lines DL of the display panel 100 through the fourth bonding pad 250, the third bonding pad 140 and a first fanout line FA1.

In an exemplary embodiment of the present invention, the gate flexible substrate 234 may be electrically connected to one of the gate lines GL of the display panel 100 through a fifth bonding pad of the display panel having a zigzag shape, a sixth bonding pad of the display panel having a zigzag shape and a second fanout line FA2.

In a display apparatus in accordance with an exemplary embodiment of the present invention, the second bonding pad 240 and the fourth bonding pad 250 of the flexible substrate 230 may extend in the direction which is at an acute angle with respect to the relatively longer side of the display panel 100.

Thus, adhesion between the printed circuit board 210 and the flexible substrate 230 and between the flexible substrate 230 and the display panel 100 may increase. A stress applied to the flexible substrate 230 may be distributed.

Electrical connection reliability between the printed circuit board 210 and the flexible substrate 230 and between the flexible substrate 230 and the display panel 100 may be increased.

Figure 7:
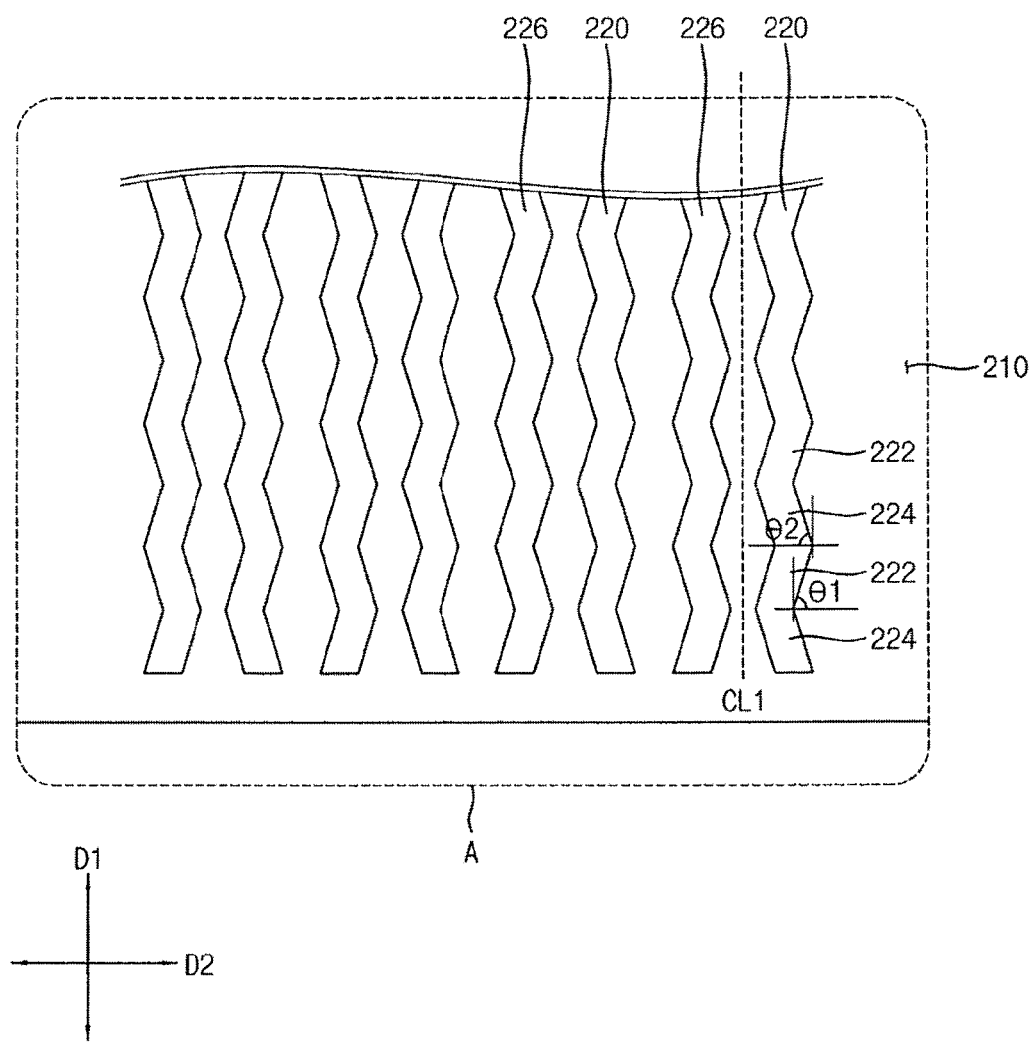
FIG. 7 is a plan view illustrating a portion of a printed circuit board according to an exemplary embodiment of the present invention.
Figure 8:
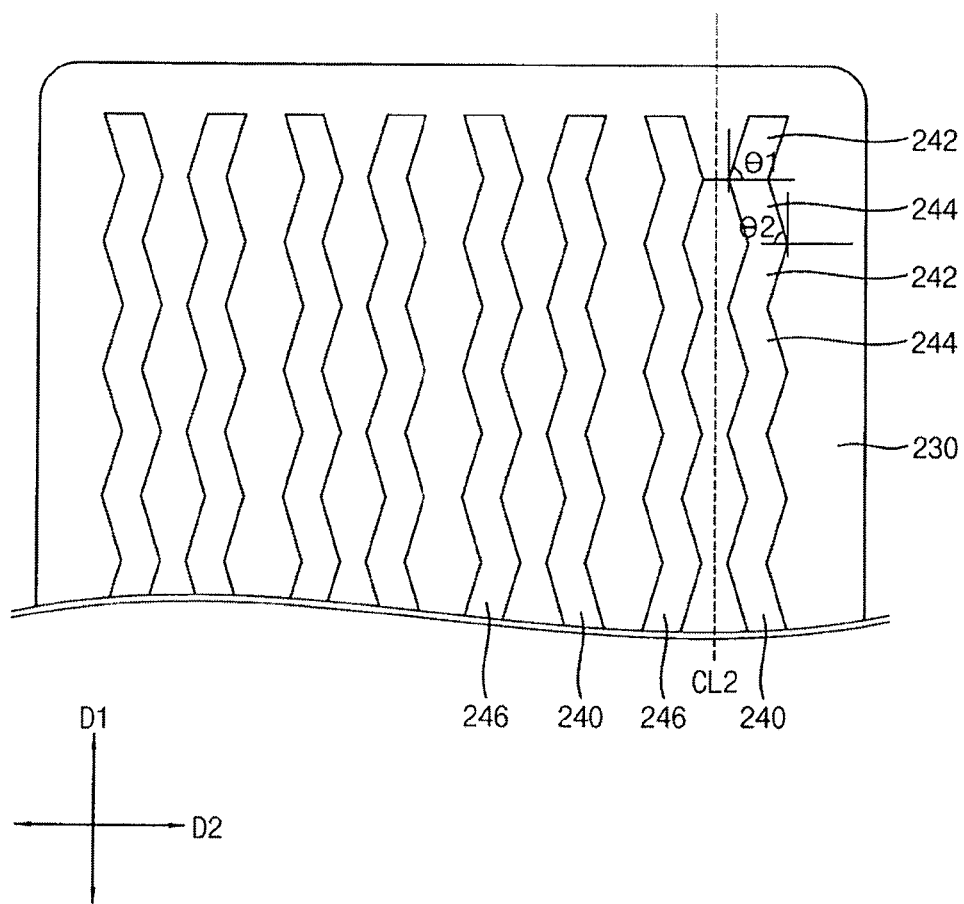
FIG. 8 is a plan view illustrating a portion of a flexible substrate according to an exemplary embodiment of the present invention.

FIG. 7 is a plan view illustrating a portion of a printed circuit board according to an exemplary embodiment of the present invention. FIG. 8 is a plan view illustrating a portion of a flexible substrate according to an exemplary embodiment of the present invention. The first and second bonding pads described with reference to FIGS. 7 and 8 may be substantially the same as the first and second bonding pads described with reference to FIGS. 1 to 6, except for a shape of bonding pads. Thus, duplicative descriptions of the bonding pads may be omitted.

Referring to FIGS. 1, 2, 7 and 8, the display apparatus may include the display panel 100 and the display panel driver 200.

The display panel 100 may include the active region AA on which an image may be displayed and the peripheral region PA adjacent to the active region AA, which might not display the image. The active region AA may be referred to as a display region.

The display panel 100 may include the plurality of gate lines GL, each of which may extend along the first direction D1, and the plurality of data lines DL, each of which may extend along the second direction D2 crossing the first direction D1. The display panel 100 may include the plurality of pixels. The pixels may be electrically connected to the gate lines GL and the data lines DL. The gate lines GL, the data lines DL and the pixels may be disposed in the active region AA of the display panel 100.

Each pixel may include the switching element TR, the liquid crystal capacitor and the storage capacitor. The liquid crystal capacitor and the storage capacitor may be electrically connected to the switching element TR. The pixels may be disposed in a matrix.

The display panel 100 may include the first substrate 110 and the second substrate 120 opposite to the first substrate 110.

The display panel driver 200 may apply a driving signal to the display panel 100. The display panel driver 200 may include the printed circuit board 210 including the first bonding pad 220, the flexible substrate 230 including the second bonding pad 240 and electrically connecting the printed circuit board 210 with the display panel 100. The first bonding pad 220 may overlap the second bonding pad 240.

The printed circuit board 210 may include a driving circuit such as a timing controller, or a power voltage generator. The flexible substrate 230 may include polyimide.

Each of the first bonding pad 220 of the printed circuit board 210 and the second bonding pad 240 may extend in a direction. The direction in which the first bonding pad 220 of the printed circuit board 210 and the second bonding pad 240 extend may be at an acute angle with respect to the first direction D1 parallel with the relatively shorter side of the display panel 100 and the second direction D2 parallel with the relatively longer side of the display panel 100.

Referring to FIG. 7, the first bonding pad 220 may include the first extension portion 222 extending in the third direction which is at the first acute angle $\theta 1$ with respect to the relatively longer side of the display panel 100 and the second extension portion 224 extending in the fourth direction which is at the second acute angle $\theta 2$ with respect to the relatively longer side of the display panel 100.

The first bonding pad 220 may include the plurality of first extension portions 222 and the plurality of second extension portions 224 connected to each other repeatedly to form a continuous extension portion having a zigzag shape.

In an exemplary embodiment of the present invention, the display apparatus may include a plurality of first bonding pads 220 and 226. The first bonding pad 220 may be arranged symmetrically between adjacent first bonding pads 226 with respect to a first center line CL1 between the first bonding pads 220 and 226.

Referring to FIG. 8, the second bonding pad 240 may include the first extension portion 242 extending in the third direction and the second extension portion 244 extending in the fourth direction.

The second bonding pad 240 may include the plurality of first extension portions 242 and the plurality of second extension portions 244 connected to each other repeatedly to form a continuous extension portion having a zigzag shape.

In an exemplary embodiment of the present invention, the display apparatus may include a plurality of second bonding pads 240 and 246. The second bonding pad 240 may be arranged symmetrically between adjacent second bonding pads 246 with respect to a second center line CL2 between the second bonding pads 240 and 246.

Thus, the position of the first bonding pads 220 and 226 may correspond to the position of the second bonding pads 240 and 246 and the first bonding pads 220 and 226 and the second bonding pads 240 and 246 may be electrically connected to each other, respectively.

Each of the first bonding pads 220 and 226 and each of the second bonding pads 240 and 246 may extend with a zigzag shape.

In a display apparatus in accordance with an exemplary embodiment of the present invention, the second bonding pads 240 and 246 arranged on a portion of the flexible substrate 230 may extend in the direction which is at an acute angle with respect to the relatively longer side of the display panel 100.

Thus, an adhesion between the printed circuit board 210 and the flexible substrate 230 may increase. A stress applied to the flexible substrate 230 may be distributed. Electrical connection reliability between the printed circuit board 210 and the flexible substrate 230 may be increased.

Figure 9:
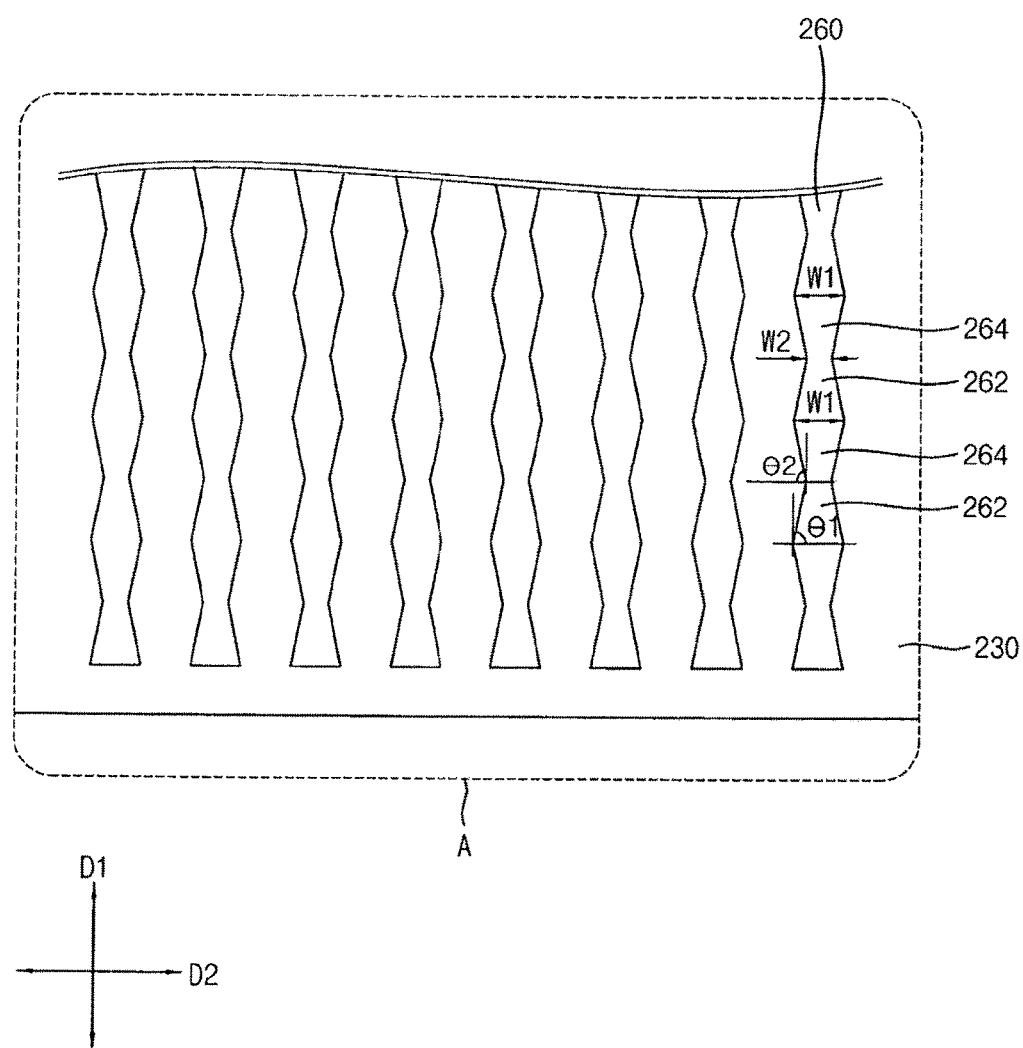
FIG. 9 is a plan view illustrating a portion of a printed circuit board according to an exemplary embodiment of the present invention.
Figure 10:
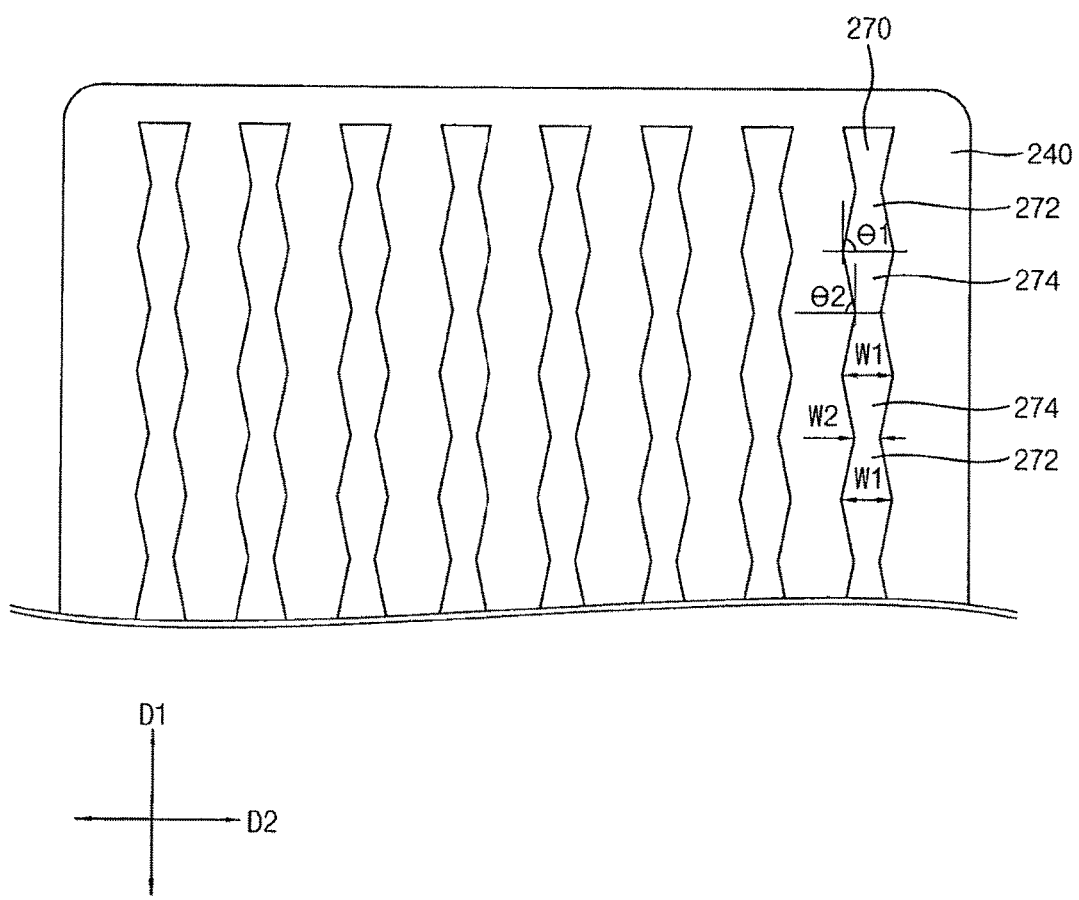
FIG. 10 is a plan view illustrating a portion of a flexible substrate according to an exemplary embodiment of the present invention.

FIG. 9 is a plan view illustrating a portion of a printed circuit board according to an exemplary embodiment of the present invention. FIG. 10 is a plan view illustrating a portion of a flexible substrate according to an exemplary embodiment of the present invention. The first and second bonding pads described with reference to FIGS. 9 and 10 may be substantially the same as the first and second bonding pads described with reference to FIGS. 1 to 6, except for a shape of bonding pads. Thus, duplicative descriptions of the bonding pads may be omitted.

Referring to FIGS. 1, 2, 9 and 10, a display apparatus may include the display panel 100 and the display panel driver 200.

The display panel 100 may include the active region AA on which an image may be displayed and the peripheral region PA adjacent to the active region AA, which might not display the image. The active region AA may be referred to as a display region.

The display panel 100 may include the plurality of gate lines GL, each of which may extend along the first direction D1, and the plurality of data lines DL, each of which may extend along the second direction D2 crossing the first direction D1. The display panel 100 may include the plurality of pixels. The pixels may be electrically connected to the gate lines GL and the data lines DL. The gate lines GL, the data lines DL and the pixels may be disposed in the active region AA of the display panel 100.

Each pixel may include the switching element TR, the liquid crystal capacitor and the storage capacitor. The liquid crystal capacitor and the storage capacitor may be electrically connected to the switching element TR. The pixels may be disposed in a matrix.

The display panel 100 may include the first substrate 110 and the second substrate 120 opposite to the first substrate 110.

The display panel driver 200 may apply a driving signal to the display panel 100. The display panel driver 200 may include the printed circuit board 210 including a first bonding pad 260, the flexible substrate 230 including the second bonding pad 270 and electrically connecting the printed circuit board 210 with the display panel 100. The first bonding pad 260 may overlap the second bonding pad 270.

The printed circuit board 210 may include a driving circuit such as a timing controller, or a power voltage generator. The flexible substrate 230 may include polyimide.

Each of the first bonding pad 260 of the printed circuit board 210 and the second bonding pad 270 of the flexible substrate 230 may extend in a direction. The direction in which the first bonding pad 260 of the printed circuit board 210 and the second bonding pad 270 of the flexible substrate 230 extend may be at an acute angle with respect to the first direction D1 parallel with the relatively shorter side of the display panel 100 and the second direction D2 parallel with the relatively longer side of the display panel 100.

Referring to FIG. 9, the first bonding pad 260 may include a first extension portion 262 extending in the third direction which is at the first acute angle $\theta 1$ with respect to the long side of the display panel 100 and a second extension portion 264 extending in the fourth direction which is at the second acute angle $\theta 2$ with respect to the relatively longer side of the display panel 100.

The first bonding pad 260 may include a plurality of first extension portions 262 and a plurality of second extension portions 264 connected to each other repeatedly to form a continuous extension portion having a zigzag shape.

In an exemplary embodiment of the present invention, a width of the first extension portion 262 of the first bonding pad 260 may decrease gradually along the first direction D1 parallel with the relatively shorter side of the display panel 100 from a first width W1 to a second width W2. A width of the second extension portion 264 of the first bonding pad 260 may increase gradually along the first direction D1 parallel with the relatively shorter side of display panel 100 from the second width W2 to the first width W1.

Referring to FIG. 10, the second bonding pad 270 may include a first extension portion 272 extending in the third direction and a second extension portion 274 extending in the fourth direction.

The second bonding pad 270 may include a plurality of first extension portions 272 and a plurality of second extension portions 274 connected to each other repeatedly to form a continuous extension portion having alternating sections having the first width W1 and the second width W2.

In an exemplary embodiment of the present invention, a width of the first extension portion 272 of the second bonding pad 270 may decrease gradually along the first direction D1 from the first width W1 to the second width W2. A width of the second extension portion 274 of the second bonding pad 270 may increase gradually along the first direction D1 from the second width W2 to the first width W1.

In an exemplary embodiment of the present invention, the display apparatus may include a plurality of first bonding pads 260 on the printed circuit board 210. The display apparatus may include a plurality of second bonding pads 270 on the flexible substrate 230.

The position of first bonding pad 260 may correspond to the position of the second bonding pad 270, and the first bonding pad 260 and the second bonding pad 270 may be electrically connected to each other.

In the display apparatus in accordance with an exemplary embodiment of the present invention, the second bonding pad 270 arranged on a portion of the flexible substrate 230 may extend in the direction which is at an acute angle with respect to the relatively longer side of the display panel 100.

Accordingly, an adhesion between the printed circuit board 210 and the flexible substrate 230 may increase. A stress applied to the flexible substrate 230 may be distributed. Electrical connection reliability between the printed circuit board 210 and the flexible substrate 230 may be increased.

Figure 11:
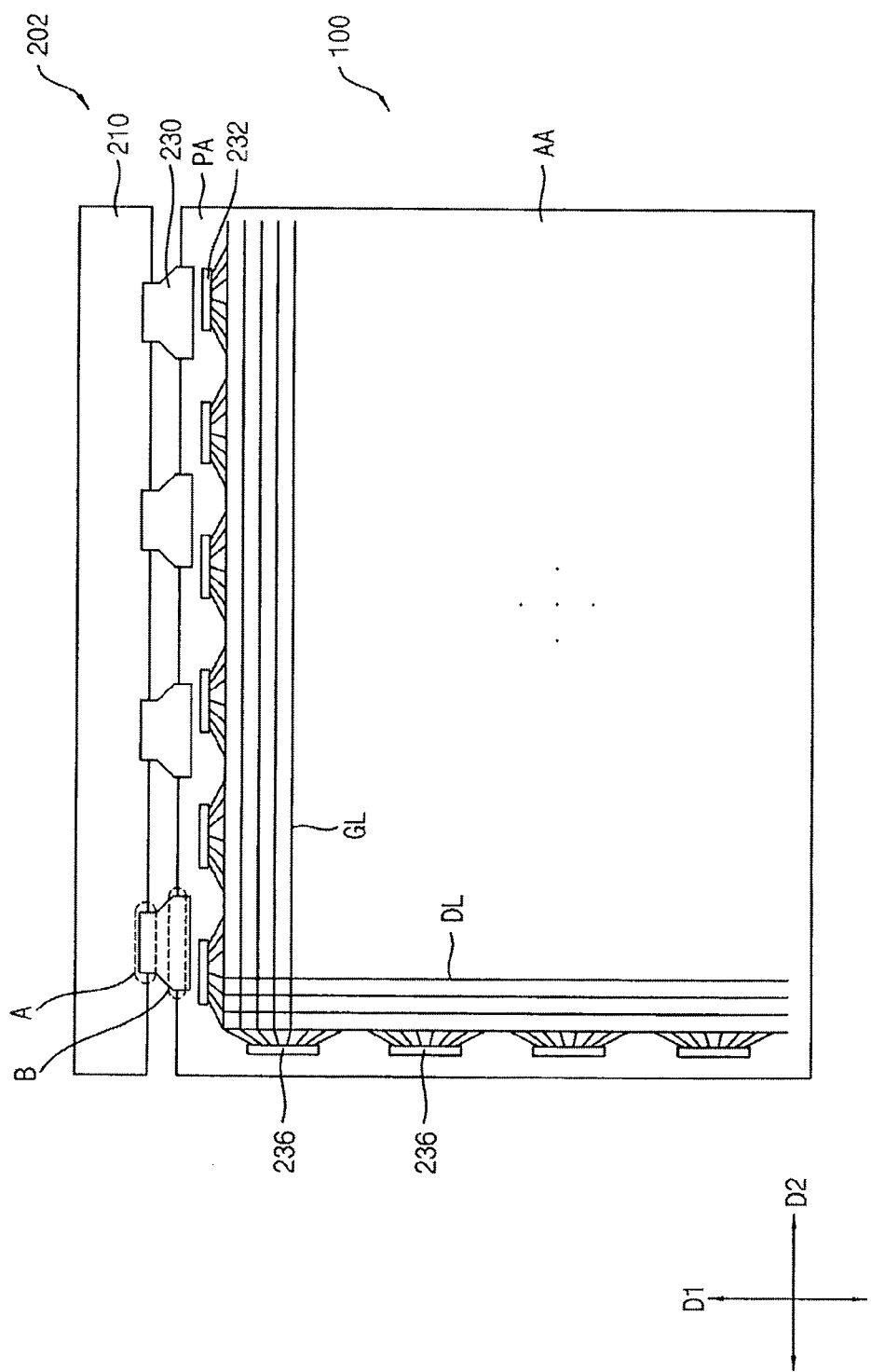
FIG. 11 is a plan view illustrating a display apparatus according to an exemplary embodiment of the present invention.

FIG. 11 is a plan view illustrating a display apparatus according to an exemplary embodiment of the present invention. The display apparatus described with reference to FIG. 11 may be substantially the same as of the display apparatus described with reference to FIGS. 1 to 6, except for arrangement of data driving chip and gate driving chip. Thus, duplicative descriptions may be omitted.

Referring to FIGS. 2 to 6 and 11, a display apparatus may include the display panel 100 and the display panel driver 202.

The display panel 100 may include the active region AA on which an image may be displayed and the peripheral region PA adjacent to the active region AA, which might not displaying the image. The active region AA may be referred to as a display region.

The display panel 100 may include the plurality of gate lines GL, each of which may extend along the first direction D1, and the plurality of data lines DL, each of which may extend along the second direction D2 crossing the first direction D1. The display panel 100 may include a plurality of pixels. The pixels may be electrically connected to the gate lines GL and the data lines DL. The gate lines GL, the data lines DL and the pixels may be disposed in the active region AA of the display panel 100.

Each pixel may include the switching element TR, the liquid crystal capacitor and the storage capacitor. The liquid crystal capacitor and the storage capacitor may be electrically connected to the switching element TR. The pixels may be disposed in a matrix.

The display panel 100 may include the first substrate 110 and the second substrate 120 opposite to the first substrate 110.

The display panel driver 202 may apply a driving signal to the display panel 100. The display panel driver 202 may include the printed circuit board 210 including the first bonding pad 220, the flexible substrate 230 including the second bonding pad 240 and electrically connecting the printed circuit board 210 with the display panel 100. The first bonding pad 220 may overlap the second bonding pad 240.

The display panel driver 202 may include the data driving chip 232 which may be disposed on the first substrate 110. The data driving chip 232 may be electrically connected to one of the data lines DL of the display panel 100 and may apply the driving signal to at least one of the data lines DL.

The display panel driver 202 may include the gate driving chip 236 which may be disposed on the first substrate 110. The gate driving chip 236 may be electrically connected to the display panel 100.

The data driving chip 232 and gate driving chip 236 may be disposed on the first substrate 110 in a COG (chip on glass) configuration. For example, the data driving chip 232 may adhere to the peripheral region (PA) of the first substrate 110 by an adhesive layer disposed between the data driving chip 232 and the first substrate 110.

Each of the first bonding pad 220 of the printed circuit board 210 and the second bonding pad 240 may extend in a direction. The direction in which the first bonding pad 220 of the printed circuit board 210 and the second bonding pad 240 extend may be at an acute angle with respect to the first direction D1 parallel with the relatively shorter side of the display panel 100 and the second direction D2 parallel with the relatively longer side of the display panel 100.

The relatively longer side of the display panel 100 may be parallel with the second direction D2, and the relatively shorter side of the display panel 100 may be parallel with the first direction D1.

In a display apparatus in accordance with an exemplary embodiment of the present invention, the second bonding pad 240 arranged on a portion of the flexible substrate 230 and the fourth bonding pad 250 arranged on another portion of the flexible substrate 250 may extend in the direction which is at an acute angle with respect to the relatively longer side of the display panel 100.

Accordingly, adhesions between the printed circuit board 210 and the flexible substrate 230 and between the flexible substrate 230 and the display panel 100 may increase. A stress applied to the flexible substrate 230 may be distributed.

Electrical connection reliability between the printed circuit board 210 and the flexible substrate 230 and between the flexible substrate 230 and the display panel 100 may be increased.

Figure 12:
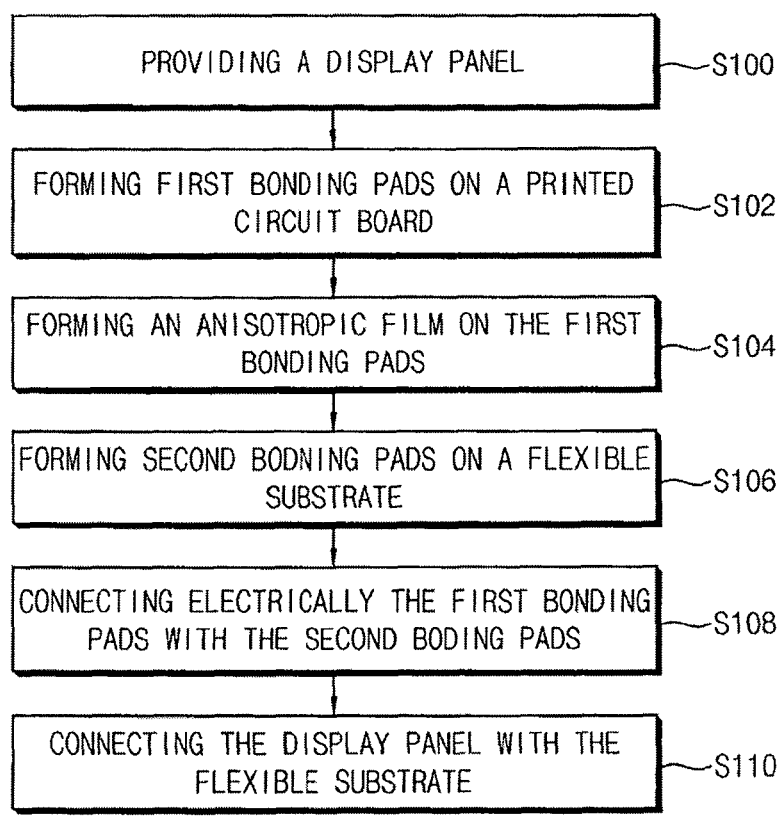
FIG. 12 is a flow-chart illustrating a method of manufacturing a display apparatus according to an exemplary embodiment of the present invention.

FIG. 12 is a flow-chart illustrating a method of manufacturing a display apparatus according to an exemplary embodiment of the present invention. FIGS. 13 to 17 are cross-sectional views illustrating the method of FIG. 12.

Referring to FIGS. 1, 2 and 12, the display panel 100 may be provided. The display panel 100 may include the switching element TR, the first substrate 110 including the pixel electrode PE electrically connected to the switching element TR and the second substrate 120 facing to the first substrate 110 (S100).

The display panel 100 may include the active region AA on which an image may be displayed and the peripheral region PA adjacent to the active region AA, which might not display the image. The active region AA may be referred to as a display region.

The display panel 100 may include the plurality of gate lines GL, each of which may extend along the first direction D1, and the plurality of data lines DL, each of which may extend along the second direction D2 crossing the first direction D1. The display panel 100 may include a plurality of pixels. The pixels may be electrically connected to the gate lines GL and the data lines DL. The gate lines GL, the data lines DL and the pixels may be disposed in the active region AA of the display panel 100.

Each pixel may include the switching element TR, the liquid crystal capacitor and the storage capacitor. The liquid crystal capacitor and the storage capacitor may be electrically connected to the switching element TR. The pixels may be disposed in a matrix.

Figure 13:
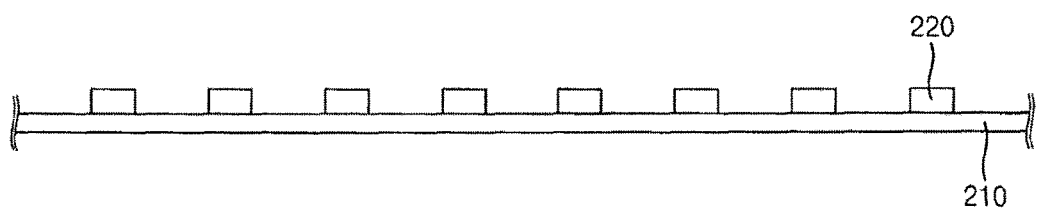
FIGS. 13 to 17 are cross-sectional views illustrating the method of FIG. 12.

Referring to FIGS. 3, 12 and 13, the plurality of first bonding pads 220 may be formed on the printed circuit board 210 (S102). Each of the first bonding pads 220 may extend in a direction. The direction in which the first bonding pads 220 extend may be at an acute angle with respect to the first direction D1 parallel with the relatively shorter side of the display panel 100 and the second direction D2 parallel with the relatively longer side of the display panel 100.

Referring to FIG. 3, each of the first bonding pads 220 may include the first extension portion 222 extending in the third direction which is at a first acute angle θ1 with respect to the relatively longer side of the display panel 100 and the second extension portion 224 extending in the third direction which is at a second acute angle θ2 with respect to the relatively longer side of the display panel 100.

Each of the first bonding pads 220 may include the plurality of first extension portions 222 and the plurality of second extension portions 224 connected to each other repeatedly to form a continuous extension portion.

Figure 14:
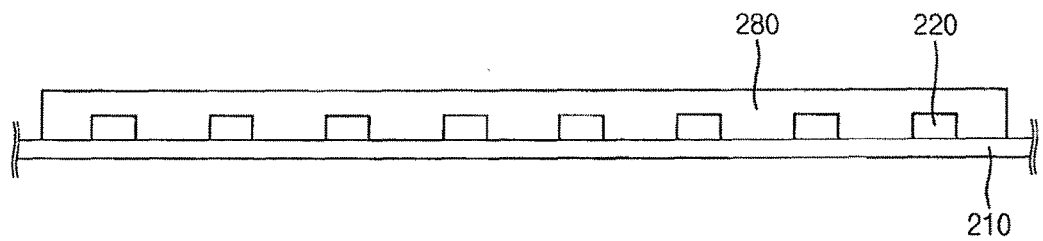

Referring to FIGS. 12 and 14, an anisotropic conductive film 280 may be formed on the first bonding pads 220 and the printed circuit board 210 (S104). For example, the anisotropic conductive film 280 may cover the first bonding pads 220.

The anisotropic conductive film 280 may include resin and a plurality of conductive balls. The anisotropic conductive film 280 may transfer an electric signal along a direction.

Figure 15:
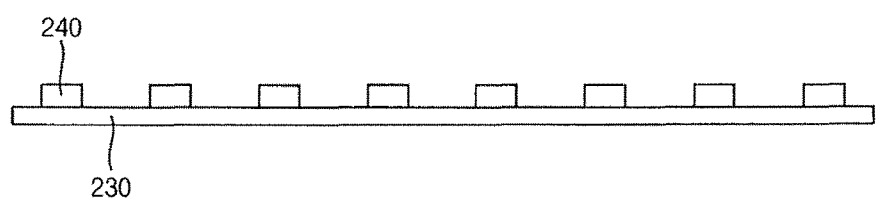

Referring to FIGS. 4 and 15, the plurality of second bonding pads 240 may be formed on the flexible substrate 230 (S106). Each of second bonding pads 240 may extend in a direction. The direction in which the second bonding pads 240 extend may be at an acute angle with respect to the relatively longer side and the relatively shorter side of the display panel 100.

Referring to FIG. 4, each of the second bonding pads 240 may include the first extension portion 242 extending in the third direction and the second extension portion 244 extending in the fourth direction.

Each of the second bonding pads 240 may include the plurality of first extension portions 242 and the plurality of second extension portions 244 connected to each other repeatedly to form a continuous extension portion.

Figure 16:
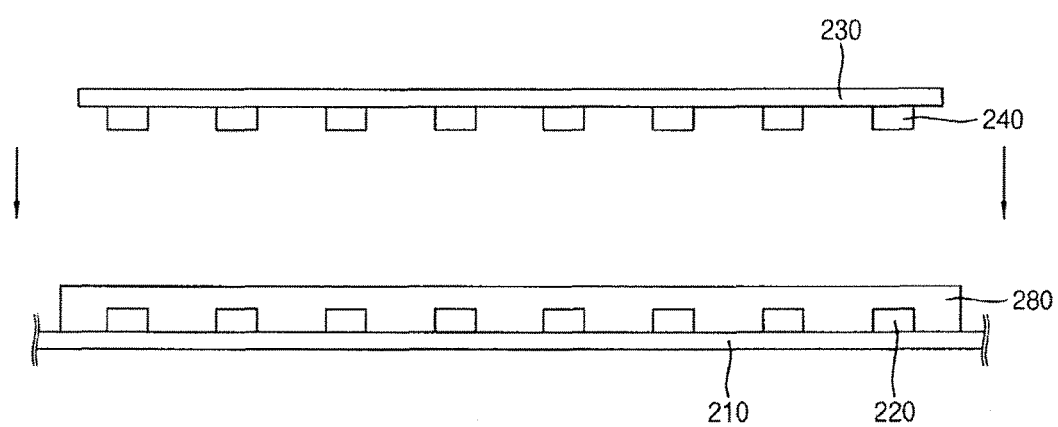
Figure 17:
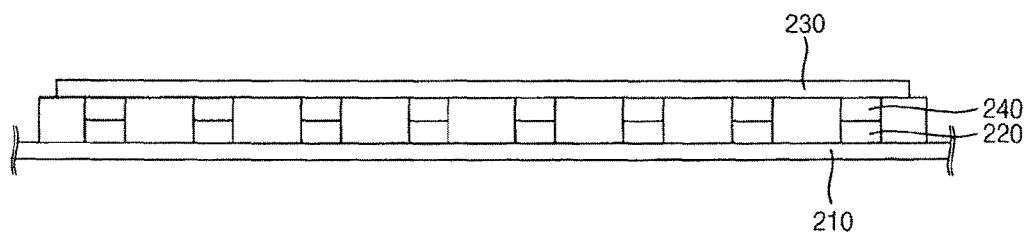

Referring to FIGS. 12 and 16, the flexible substrate 230 may be aligned with the printed circuit board 210 such that at least a portion of the flexible substrate 230 may be aligned with at least a portion of the printed circuit board 210. A thermal compression process may be performed to the portion of the flexible substrate 230 and the portion of the printed circuit board 210 to electrically connect each of the first bonding pads 220 with each of the second bonding pads 240 (S108).

Another thermal compression process may be performed to a portion of display panel 100 and another portion of the flexible substrate 230 to connect the flexible substrate 230 with the display panel 100 (S110). The flexible substrate 230 may be electrically connected with the display panel 100.

According to the a method of manufacturing a display apparatus in accordance with an exemplary embodiment of the present invention, the second bonding pad 240 arranged on a portion of the flexible substrate 230 may extend in the direction which is at an acute angle with respect to the relatively longer side of the display panel 100.

Accordingly, an adhesion between the printed circuit board 210 and the flexible substrate 230 may increase. A stress applied to the flexible substrate 230 may be distributed. Electrical connection reliability between the printed circuit board 210 and the flexible substrate 230 may be increased.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display apparatus comprising:
a display panel including a first substrate and a second substrate facing the first substrate, the first substrate including a switching element and a pixel electrode electrically connected to the switching element; and
a display panel driver applying a driving signal to the display panel, the display panel driver including:
a printed circuit board including a first bonding pad; and
a flexible substrate electrically connecting the printed circuit board with the display panel, the flexible substrate including a second bonding pad, the second bonding pad electrically connected to the first bonding pad of the printed circuit board,
wherein the first bonding pad overlaps the second bonding pad, and
wherein at least a portion of the first bonding pad and at least a portion of the second bonding pad extend in a direction which is at an acute angle with respect to a first direction parallel with a relatively longer side of the display panel.

2. The display apparatus of claim 1, wherein the first bonding pad includes a first extension portion extending in a second direction which is at a first acute angle with respect to the first direction and a second extension portion extending in a third direction which is at a second acute angle with respect to the first direction, and
wherein the second bonding pad includes a first extension portion extending in the second direction and a second extension portion extending in the third direction.

3. The display apparatus of claim 2, wherein each of the first bonding pad and the second bonding pad extends with a zigzag shape.

4. The display apparatus of claim 2, wherein a width of the first extension portion of the first bonding pad decreases along a fourth direction parallel with a relatively shorter side of the display panel, and
wherein a width of the second extension portion of the first bonding pad increases along the fourth direction.

5. The display apparatus of claim 1, wherein the display panel further includes a third bonding pad electrically connected to the switching element,
wherein the flexible substrate further includes a fourth bonding pad electrically connected to the third bonding pad, and the fourth bonding pad overlaps the third bonding pad.

6. The display apparatus of claim 5, wherein the third bonding pad includes a first extension portion extending in a second direction which is at a first acute angle with respect to the first direction and a second extension portion extending in a third direction which is at a second acute angle with respect to the first direction, and
wherein the fourth bonding pad includes a first extension portion extending in the second direction and a second extension portion extending in the third direction.

7. The display apparatus of claim 6, wherein each of the third bonding pad and the fourth bonding pad extends with a zigzag shape.

8. The display apparatus of claim 6, wherein a width of the first extension portion of the third bonding pad decreases along a fourth direction parallel with a relatively shorter side of the display panel, and
wherein a width of the second extension portion of the third bonding pad increases along the fourth direction.

9. The display apparatus of claim 1, wherein the display panel further includes a data line and a gate line electrically connected to the switching element, and
wherein the display panel driver further includes a driving chip applying the driving signal to the data line or the gate line.

10. The display apparatus of claim 9, wherein the driving chip is disposed on the flexible substrate.

11. The display apparatus of claim 9, wherein the driving chip is disposed on the display panel.

12. The display apparatus of claim 9, wherein the driving chip includes a data driving chip applying a data signal to the data line and a gate driving chip applying a gate signal to the gate line.

13. A method of manufacturing a display apparatus, the method comprising:
providing a display panel including a first substrate and a second substrate facing the first substrate, the first substrate including a switching element and a pixel electrode electrically connected to the switching element;
forming a first bonding pad on a printed circuit board, the first bonding pad extending in a direction, the direction being at an acute angle with respect to a first direction parallel with a relatively longer side of the display panel;
forming an anisotropic conductive film on the first bonding pad;
forming a second bonding pad on a flexible substrate, the second bonding pad extending in the direction at the acute angle with respect to the first direction;
aligning the flexible substrate with the printed circuit board such that at least a portion of the flexible substrate overlaps at least a portion of the printed circuit board;
performing a thermal compression process on at least the portion of the flexible substrate and at least the portion of the printed circuit board to electrically connect the first bonding pad with the second bonding pad; and
electrically connecting the flexible substrate with the display panel.

14. The method of claim 13, wherein forming the first bonding pad on the printed circuit board includes:
forming a first extension portion of the first bonding pad extending in a second direction which is at a first acute angle with respect to the first direction; and
forming a second extension portion of the first bonding pad extending in a third direction which is at a second acute angle with respect to the first direction.

15. The method of claim 14, wherein the first bonding pad extends with a zigzag shape.

16. The method of claim 14, wherein a width of the first extension portion of the first bonding pad decreases along a fourth direction parallel with a relatively shorter side of the display panel, and
wherein a width of the second extension portion of the first bonding pad increases along the fourth direction.

17. The method of claim 13, wherein forming the second bonding pad on the flexible substrate includes:
forming a first extension portion of the second bonding pad extending in a second direction which is at a first acute angle with respect to the first direction; and
forming a second extension portion of the second bonding pad extending in a third direction which is at second acute angle with respect to the first direction.

18. The method of claim 17, wherein the second bonding pad extends with a zigzag shape.

19. The method of claim 17, wherein a width of the first extension portion of the second bonding pad decreases along a fourth direction parallel with a relatively shorter side of the display panel and
wherein a width of the second extension portion of the second bonding pad increases along the fourth direction.

20. The method of claim 13, wherein the display panel further includes a data line and a gate line electrically connected to the switching element, and
wherein the first bonding pad is electrically connected to the data line or the gate line.

* * * * *